Patented Nov. 16, 1943

2,334,310

UNITED STATES PATENT OFFICE 2,334,310

ANTISPASMODIC AGENTS

Robert R. Burtner, Skokie, Ill., assignor to G. D. Searle & Co., Skokie, Ill., a corporation of Illinois No Drawing. Application August 7, 1942, Serial No. 454,012

3 Claims. (Cl. 260—335)

This invention relates to certain aminoalcohol esters of xanthene-9-carboxylic acid which I have found to be highly potent and useful antispasmodic agents. The composition of these esters is represented by the formula

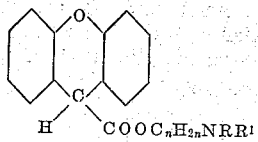

wherein $n$ stands for the integer 2 or 3 and R and $R^1$ each stand for alkyl groups containing not more than four carbon atoms. So far as I am aware, these compounds have not been prepared or described by any other worker in the prior art. These esters have been tested as antispasmodic agents, and found to be exceedingly effective against spasms of both nervous and muscular origin. Such duel effectiveness is unusual among either naturally occurring or synthetic antispasdomic agents, and contributes considerably to the ultimate utility of these compounds in the healing arts.

The prior art discloses aminoalcohol esters of certain other polynuclear acids to be very effective antispasmodic agents, as for example in United States Letters Patent No. 2,262,754, dated November 18, 1941, in which there is disclosed the great efficacy of certain aminoalcohol esters of fluorene-9-carboxylic acid as antispasmodic agents. However, it has been found in numerous trials that such activity is by no means a regular property of aminoalcohol esters of all polynuclear acids, inasmuch as similar esters of many other polynuclear acids, both homocyclic and heterocyclic, which have been prepared have been found to possess little, if any, utilizable activity as antispasmodic agents.

These esters of the present invention are most conveniently prepared from xanthene-9-carboxylic acid by heating the free acid with a dialkylaminoalkyl halide in isopropanol solution, resulting in the direct formation of the hydrochloride of the basic ester in somewhat crude form. Alternatively, esterification may be effected by treating the appropriate aminoalcohol with the acid chloride of xanthene-9-carboxylic acid. The xanthene-9-carboxylic acid itself may be prepared by methods previously described in the literature [Conant, Journal of American Chemical Society, vol. 49, page 2085 (1927)]. In following the method described in that reference, it has been found convenient to use butyllithium or phenylsodium as a metallating agent in place of sodium-potassium alloy. The following example will serve to illustrate in detail how these esters may be prepared from the acid thus obtained, without in any way limiting the scope of this invention:

A mixture of 15 grams of xanthene-9-carboxylic acid, 9 grams of β-diethylaminoethyl chloride, and 100 cubic centimeters of isopropanol is boiled under a reflux condenser for two hours. The solution is then filtered, and the solvent distilled under reduced pressure. The residue is then dissolved in water, and the basic ester liberated by the addition of alkali. The only ester is then extracted by ether, the ether solution washed with water and dried over sodium sulfate, and the solvent then completely removed. The residual ester is dissolved in anhydrous ether, and the hydrochloride then precipitated by the careful addition of one equivalent of anhydrous hydrogen chloride dissolved in anhydrous ethanol. This hydrochloride first separates as a viscous oil which crystallizes on standing in a cool place. It is then purified by recrystallization from a mixture of isopropanol and ethyl acetate, and when substantially pure has a melting point of 159–160 degrees centigrade.

Among other esters which have been prepared in accordance with the present invention from the corresponding amino halide by an identical procedure are:

| Ester | M. P. (hydrochloride) |
|---|---|
| β-diethylaminopropyl | 145° centigrade. |
| γ-diethylaminopropyl | 124° centigrade. |
| β-di-n-butylaminoethyl | Non-crystalline glass. |

All of the esters of this invention are, in the free state, oils which are insoluble in water and soluble in the common organic solvents. They readily form salts with inorganic and organic acids, some of which are readily crystalline and many of which are distinctly hygroscopic. The antispasmodic value of these compounds appears to be relatively independent of the nature of the acid forming the salt. It is to be understood that, inasmuch as the antispasmodic activity appears to be entirely resident in the basic ester portion of such salts, wherever the term "ester" is used in this specification or in the appended claims with reference to antispasmodic activity, it shall be defined to include the ester both in the free state and as combined in a salt.

These esters of the present invention (as the hydrochloride salt) when tested on strips of rabbit intestinal muscle showed unusually powerful antispasmodic effect. The diethylaminoethyl ester (which is a preferred form of this invention) is effective in abolishing contraction due to histamine (musculotropic effect) in less than half the concentration required by either papaverine (a widely used naturally occurring spasmolytic drug), or by the same ester of fluorene-9-carboxylic acid as disclosed in my said United States Letters Patent No. 2,262,754. It is far more effective than atropine against such contractions. When tested against contractions due to acetylcholine (neurotropic effect), it is effective in approximately half the concentration that was required by the corresponding ester of fluorene-9-carboxylic acid, and required a concentration only three times as great as atropine, which latter is probably the most powerful neurotropic spasmolytic agent known. This combination of high neurotropic and musculotropic activity makes this diethylamino ethyl ester of xanthene-9-carboxylic acid one of the most useful antispasmodic agents available. In addition, since it can be synthesized from readily obtainable domestic raw materials, it is particularly useful in providing a source of antispasmodic activity quite independent of imported materials, from which materials drugs such as papaverine or atropine are obtained.

Other esters embraced within this invention have also been tested for antispasmodic activity, and, while not quite as potent as the abovementioned preferred compound, they are nonetheless powerful spasmolytics as compared with compounds heretofore available.

I claim:

1. New compounds useful as antispasmodic agents, comprising the aminoalcohol esters of xanthene-9-carboxylic acid of the formula:

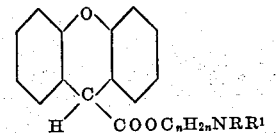

wherein $n$ is chosen from the integers 2 and 3 and R and $R^1$ each represent an alkyl group with not more than four carbon atoms.

2. New compounds useful as antispasmodic agents, comprising the aminoalcohol esters of xanthene-9-carboxylic acid of the formula:

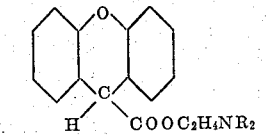

wherein R represents an alkyl group containing not more than four carbon atoms.

3. A compound useful as an antispasmodic agent, comprising the diethylaminoethyl ester of xanthene-9-carboxylic acid of the formula:

$$\text{H} \quad \text{COOC}_2\text{H}_4\text{N}(\text{C}_2\text{H}_5)_2$$

ROBERT R. BURTNER.